(12) United States Patent
Piesinger

(10) Patent No.: US 8,279,109 B1
(45) Date of Patent: Oct. 2, 2012

(54) AIRCRAFT BIRD STRIKE AVOIDANCE METHOD AND APPARATUS USING TRANSPONDER

(76) Inventor: Gregory Hubert Piesinger, Cave Creek, AZ (US)

( * ) Notice: Subject to any disclaimer, the term of this patent is extended or adjusted under 35 U.S.C. 154(b) by 359 days.

(21) Appl. No.: 12/798,154

(22) Filed: Mar. 29, 2010

Related U.S. Application Data

(60) Provisional application No. 61/211,409, filed on Mar. 30, 2009.

(51) Int. Cl.
*G01S 13/74* (2006.01)
(52) U.S. Cl. .......................................... 342/43; 342/51
(58) Field of Classification Search ............... 342/42–51
See application file for complete search history.

(56) References Cited

U.S. PATENT DOCUMENTS

| 4,994,809 A * | 2/1991 | Yung et al. ..................... 342/108 |
| 7,345,625 B1 * | 3/2008 | Urkowitz ....................... 342/174 |
| 2008/0198060 A1 * | 8/2008 | Shani et al. ...................... 342/14 |
| 2010/0039310 A1 * | 2/2010 | Smith et al. ...................... 342/29 |

* cited by examiner

*Primary Examiner* — Timothy A Brainard

(57) ABSTRACT

An aircraft avian radar is implemented using an existing aircraft transponder, Mode S, or TCAS installation as the radar transmitter. To eliminate self jamming of low level avian target signals by high level transmitter signals, the ending period of the transmission signal is digitized and cross correlated with the ending period of reflected avian target signals received after the transmission signal has ended. In a first implementation, the current transponder antenna is used for both transmission and reception. In a second implementation, an external receive only antenna is mounted in a position that maximizes the transmit antenna to receive antenna isolation. In a third implementation, a signal canceller and sample of the transmit signal are used to cancel or null out as much transmit signal as possible that couples directly to the receive antenna.

17 Claims, 8 Drawing Sheets

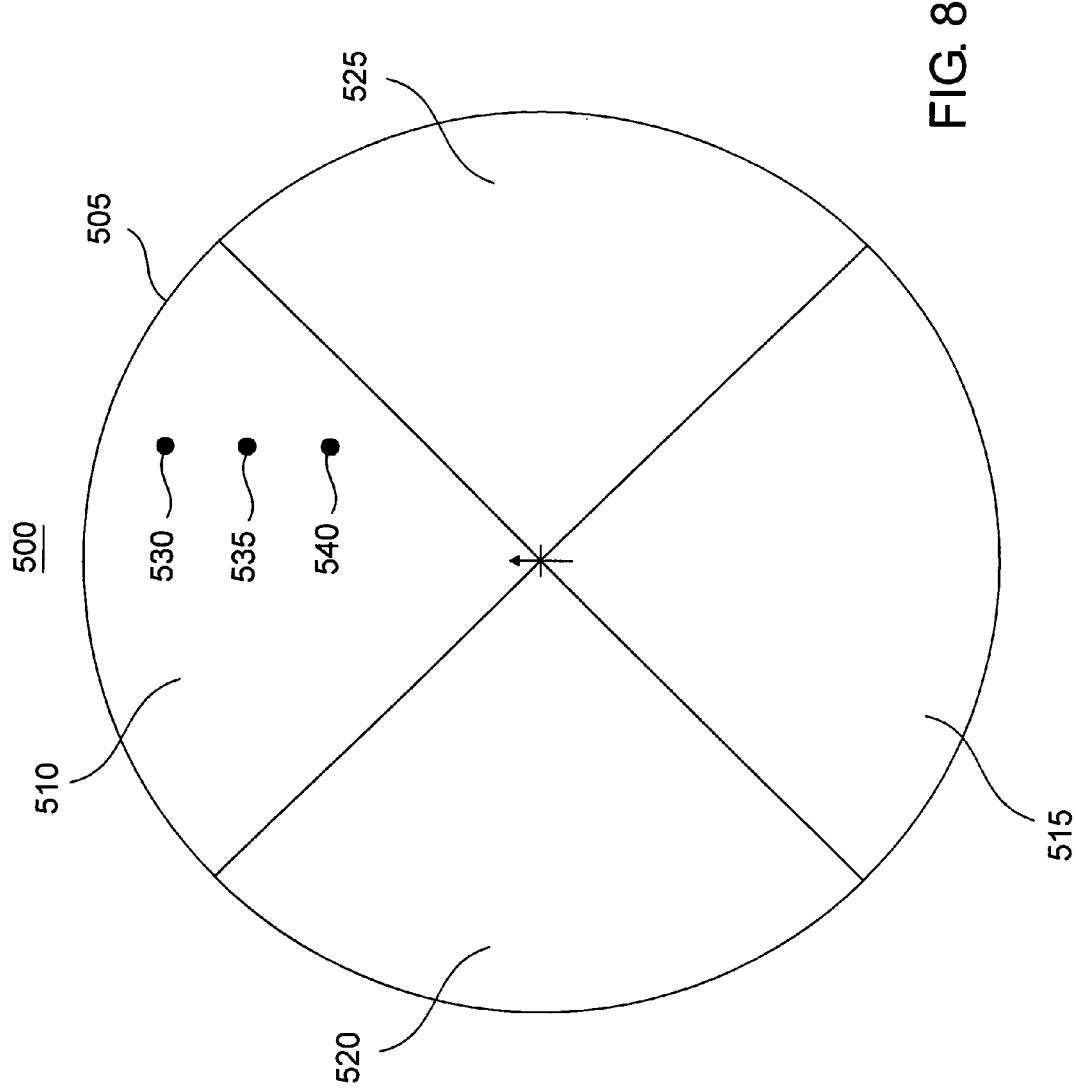

AIRCRAFT BIRD STRIKE AVOIDANCE METHOD AND APPARATUS USING TRANSPONDER

RELATED INVENTION

The present invention claims priority under 35 U.S.C. §119 (e) to: "Aircraft Bird Strike Avoidance Method and Apparatus using Transponder or Pseudolites" Provisional U.S. Patent Application Ser. No. 61/211,409, filed 30 Mar. 2009, which is incorporated by reference herein.

TECHNICAL FIELD OF THE INVENTION

The present invention relates to the detection and avoidance of imminent aircraft collisions with birds or other airborne hazards such as other aircraft.

BACKGROUND OF THE INVENTION

Aviation experts say bird-plane collisions happen daily. Nearly 200 people have been killed or injured since 1990 in accidents involving aircraft and wildlife. It is estimated that bird strikes cost military and commercial aviation over $2 billion each year due to damage and other costs. Most birds fly below 5,000 ft. However, bird strikes have occurred at 17,000 ft. and a few sightings have been made above 20,000 ft. In general, birds fly higher at night and during the spring and fall migration periods. They also fly higher in the presence of complete cloud cover.

It might be possible to equip an aircraft with a specialized high resolution scanning radar to detect and display the presence of birds. However, such a radar would be expensive and it would be difficult to find antenna installation space even on the largest aircraft.

Accordingly, there is a need for small low cost aircraft based detection equipment that will alert the pilot to the possibility of an imminent collision with a bird or other airborne hazard.

SUMMARY OF THE INVENTION

A previous U.S. patent application Ser. No. 12/657/318, filed 19 Jan. 2010 "Aircraft Bird Strike Avoidance Method and Apparatus", is incorporated by reference herein. In that application, bird strike collision avoidance techniques were presented which would alert the pilot to take evasive action to avoid colliding with birds or other imminent collision hazards such as other aircraft.

Briefly, to achieve the bird strike collision avoidance object of that invention, a radar with a non-scanning narrow elevation fan beam was used to detect the presence of hazards in a short range altitude slice ahead of the aircraft. Target amplitude, range, and Doppler tracking versus time were used to qualify the collision threat. Avoidance was based on a quick minor altitude change by the pilot or autopilot to exit the imminent bird, small aircraft, or other airborne hazard altitude collision window.

It is always difficult to add additional antennas and transmitters to aircraft. To reduce the difficulty of adding avian radar to an aircraft, the present invention describes how an existing aircraft transponder and its transmit signal can be used as part of an avian radar system. Briefly, to achieve the desired object of the present invention, the ending period of a standard transponder transmission signal is digitized, saved, and cross correlated with the ending period of reflected avian target signals. Only the ending signal period is used to avoid self jamming of the low level reflected received signal by the active transmission signal. That is, the reflected signal is ignored until the transmission signal is completed.

In a first implementation, the current transponder antenna is used for both transmission and reception. In a second implementation, an external receive only antenna is mounted in a position that maximizes the transmit antenna to receive antenna isolation. This allows more of the ending period of the transmit signal to be cross correlated with the reflected target signal without being jammed by the transmit signal. In a third implementation, a signal canceller and sample of the transmit signal are used to cancel or null out as much transmit signal as possible that couples to the receive antenna. This allows even more, or possibly all, of the transmit signal to be used without jamming the receive signal.

Reflections from avian targets are coherently cross correlated with the transponder signal to obtain target range, amplitude, and Doppler shift values. The variation of target amplitude and Doppler shift with range, as the aircraft approaches the target, are used to determine collision threat probability.

Other objects and advantages of the present invention will become obvious as the preferred embodiments are described and discussed below.

BRIEF DESCRIPTION OF THE DRAWINGS

FIG. 8 illustrates transponder and TCAS antenna patterns with respect to a centered aircraft symbol.

DETAILED DESCRIPTION OF THE PREFERRED EMBODIMENTS

Secondary Surveillance Radar (SSR) is ground based radar used by Air Traffic Control (ATC) to track airborne aircraft. When an aircraft is illuminated by this radar, a transponder aboard the aircraft sends back a coded signal which appears on the ground radar display. In the USA, this system is known as the Air Traffic Control Radar Beacon System (ATCRBS) and relies on the aircraft transponder which receives interrogations from the SSR on one frequency and responds on another frequency.

When the transponder receives a radar signal it sends back a transponder code. Early transponders were called Mode A and were later upgraded to Mode C which provided pressure altitude information. Modern transponders are called Mode S and are designed to help avoid over interrogation of the transponder, for the Traffic alert and Collision Avoidance System (TCAS), and to provide Automatic Dependent Surveillance Broadcasts (ADS-B).

The transmission frequency of transponders is 1090 MHz with power levels up to approximately 400 watts. Mode S transponders use pulse position modulation (PPM) and each transmission consists of a preamble followed by either 64 or 112 message bits. Mode A and Mode C transponders use pulse amplitude modulation (PAM) and shorter messages.

Figure 1:
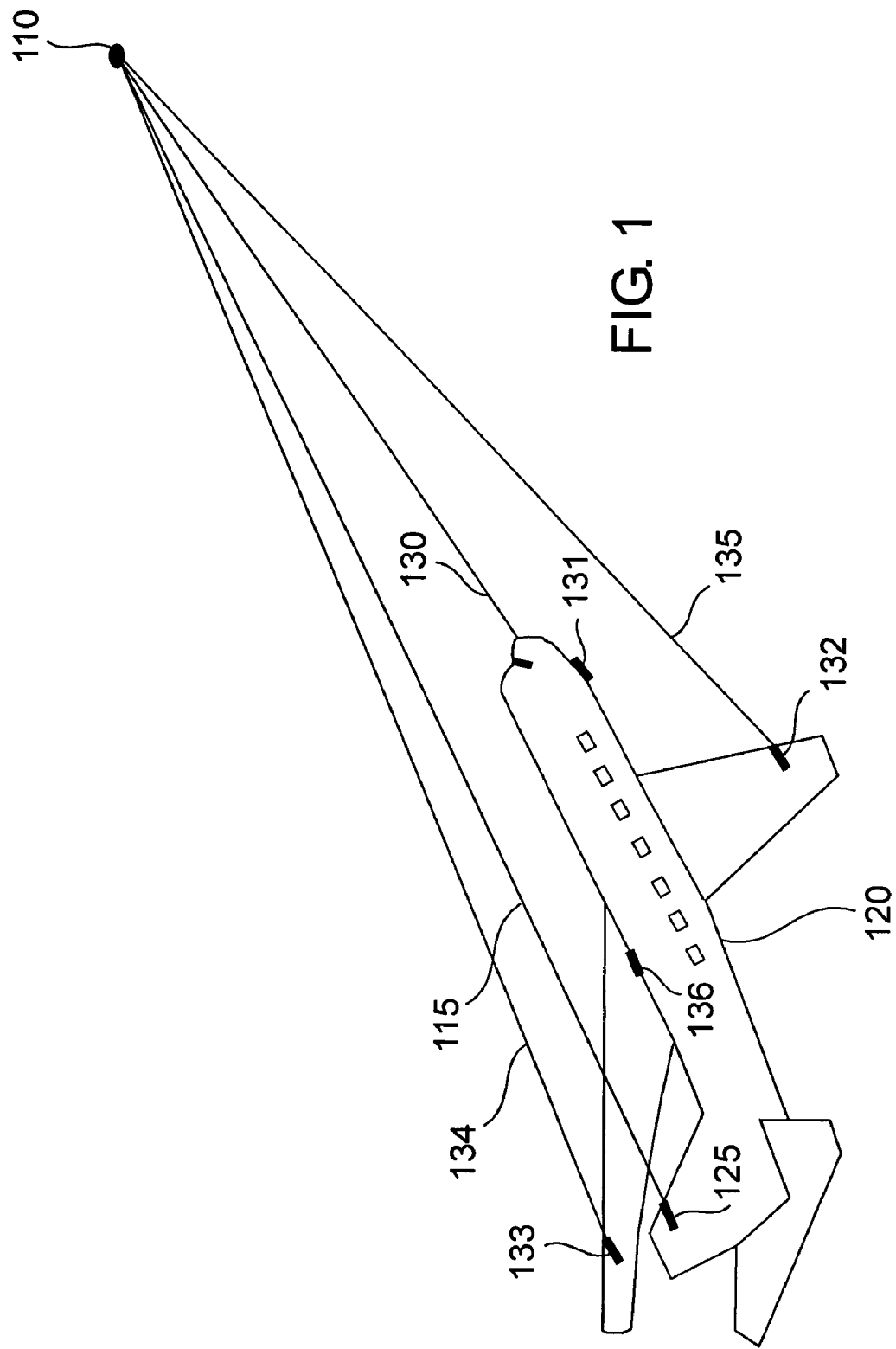
FIG. 1 illustrates an avian target ahead of an aircraft equipped with transponder and receiver antennas mounted in various possible locations on the aircraft.

The basic problem and its solution using the present invention is illustrated in FIG. 1. FIG. 1 illustrates a target 110 at range 130 in the flight path of aircraft 120. Transponder antenna 136 may be mounted as illustrated along the upper fuselage surface, along the bottom fuselage surface, or in both locations. One or more avian radar receive antennas may be mounted at location 131 on the forward bottom fuselage, location 125 in the aircraft tail, at locations 132 and 133 in the wings, or any other suitable location.

Transponder transmit signals are high power with message duration's that exceed the detectable receive range of aircraft avian radar. Ideally, the avian radar must be able to receive faint bird reflections during the transponder transmission. However, if that is not possible, then reflected target signals can be ignored until the transmission has ended.

Figure 2:
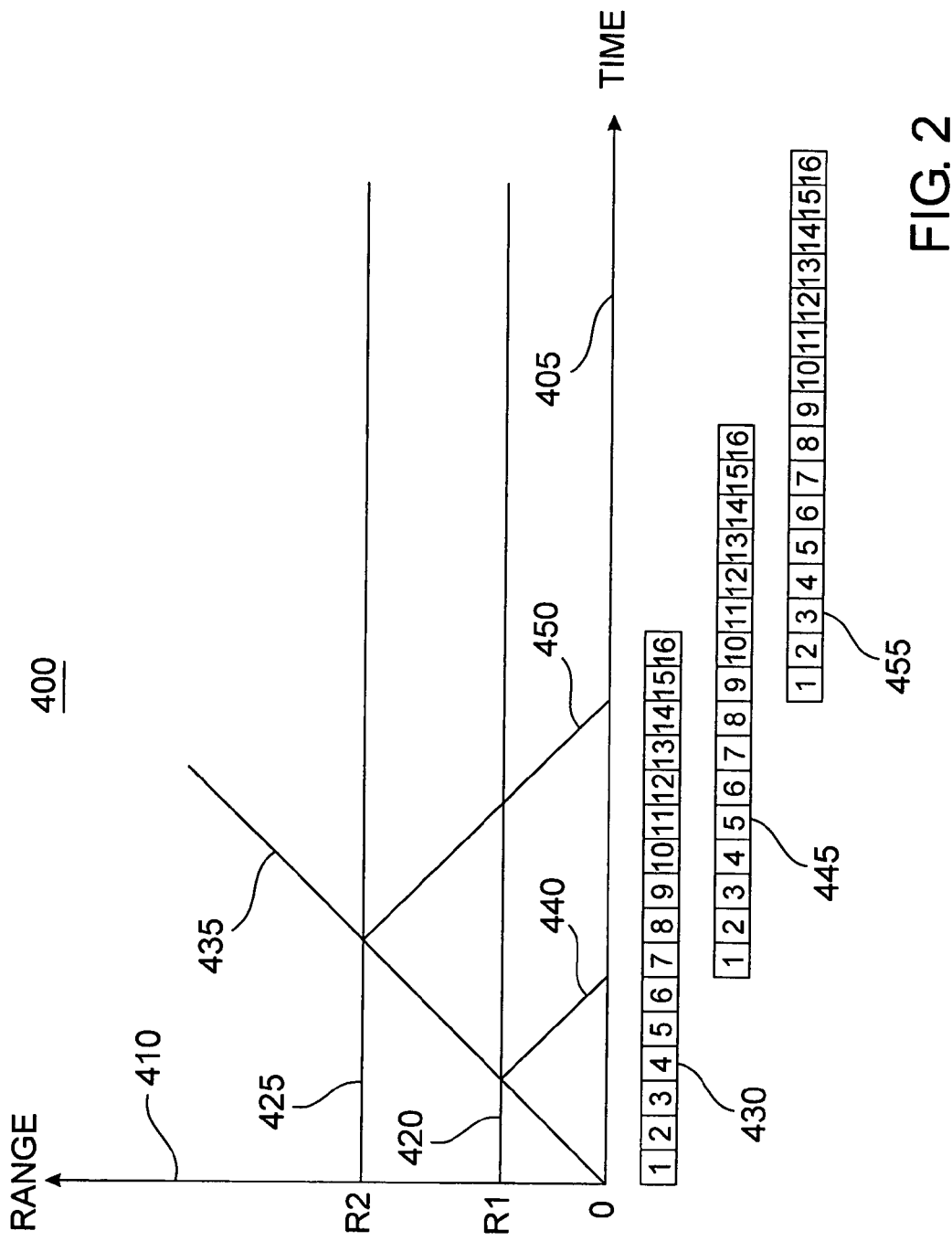
FIG. 2 illustrates a radar bounce diagram which shows the propagation of a transmit signal and its reflections from avian targets.

FIG. 2 is a signal bounce diagram 400 that illustrates the transmitted and reflected signals versus time and range. Bounce diagram consists of time axis 405, range axis 410, targets 420 and 425, and transmission signal propagation 435. At time zero and range zero (transmitter and receiver location), transmission signal 430 propagates along line 435 through bounce diagram 400 until it strikes target 420. Target 420 reflection 440 propagates back to become target 420 reflection signal 445.

Note that reflection signal 445 overlaps transmission signal 430, and is self jammed by transmission signal 430, during reflection signal 445 periods 1 through 10 but is not jammed during periods 11 through 16. By digitizing and recording a replica of transmission signal 430 and cross correlating it during periods 11 through 16 with reflection 445 over the same periods 11 through 16, target 420 can be detected even at low reflection signal 445 power levels.

Reflection signal 450 from target 425 can be detected at even lower power levels since target 425 reflection signal 455 is self jammed only during periods 1 through 2. Therefore, the sensitivity of this avian radar implementation increases at longer target ranges which helps counteract the lower power levels of longer range targets.

Simply amplitude detecting received signal energy after transponder transmission ends and calculating range based on the time of signal energy reception will not work in a typical airborne environment due to interference from other aircraft transponders. Coherent cross correlation with an exact replica of the transmit signal distinguishes transponder reflections from non-reflected signals received directly from other aircraft transponders. Other transponder signals will be shifted slightly in frequency and contain different messages and therefore will not cross correlate well.

To enhance the identification of reflected transponder signals, reflections can be normalized prior to cross correlation in a parallel process to the cross correlation that determines amplitude. When reflections have a normalized amplitude, cross correlation accurately identifies the similarity between the transmission and reflection signal. Additionally, cross correlation can be performed in segments and only those reflections that exceed a predetermined threshold for a predetermined number of segments are identified as target reflections. This technique reduces the loss of reflections that are partially overlapped by signals from other transponders which will occur in high traffic areas where many aircraft are transmitting.

To allow even more periods of reflected target signals to be cross correlated with the transmit signal, one or more external receive antennas can be mounted on the aircraft in a location and in a way that maximizes the isolation between the transmit and receive antennas.

Figure 3:
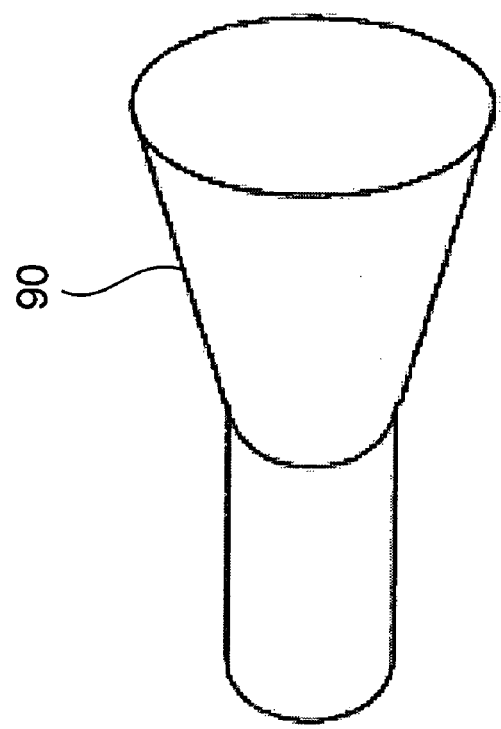
FIG. 3 illustrates possible horn type receiver antennas.
Figure 3:
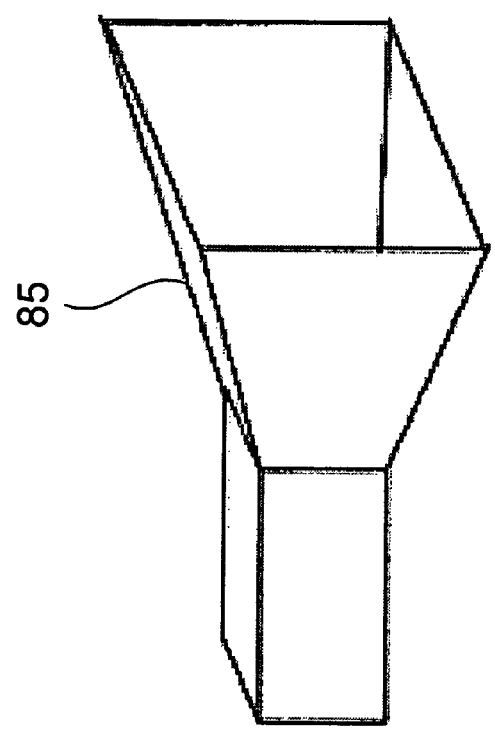
Figure 4:
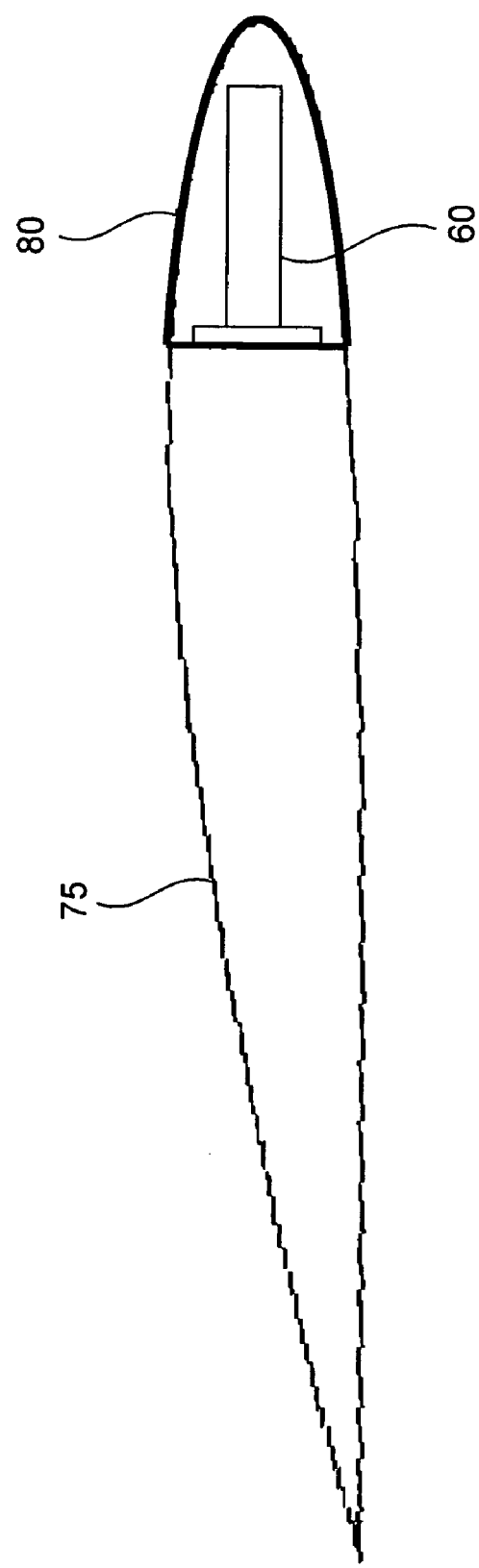
FIG. 4 illustrates a helix receive antenna mounted in the wing of an aircraft.

Among the most suitable receive antennas are rectangular horn 85, circular horn 90, or helix 60 illustrated in FIG. 3 and FIG. 4. These antennas have a forward axial response, very high front to back isolation, and can be mounted inside the wings or tail. FIG. 4 illustrates helix antenna 60 mounted inside a metal wing 75 and covered with radome material 80.

If transponder antenna 136 is mounted on the bottom of the fuselage and a receive antenna mounted at location 125, high signal isolation will be obtained between the transmit and receive antennas due to the shielding effect of the aircraft fuselage and wings.

If transponder antenna 136 is mounted over or behind the wings on top of the fuselage and the receive antenna mounted at locations 132 or 133 in the wings, high signal isolation will be obtained between the transmit and receive antennas due to the shielding effect of the aircraft metal wings. If receive antennas are mounted at both locations 132 and 133, range and azimuth position of target 110 can be determined by triangulation between ranges 135 and 134 to antenna locations 132 and 133 respectively. If third antenna 125 is used, elevation position of target 110 can be determined by triangulation between ranges 134 and 135 and range 115 to antenna location 125.

Figure 5:
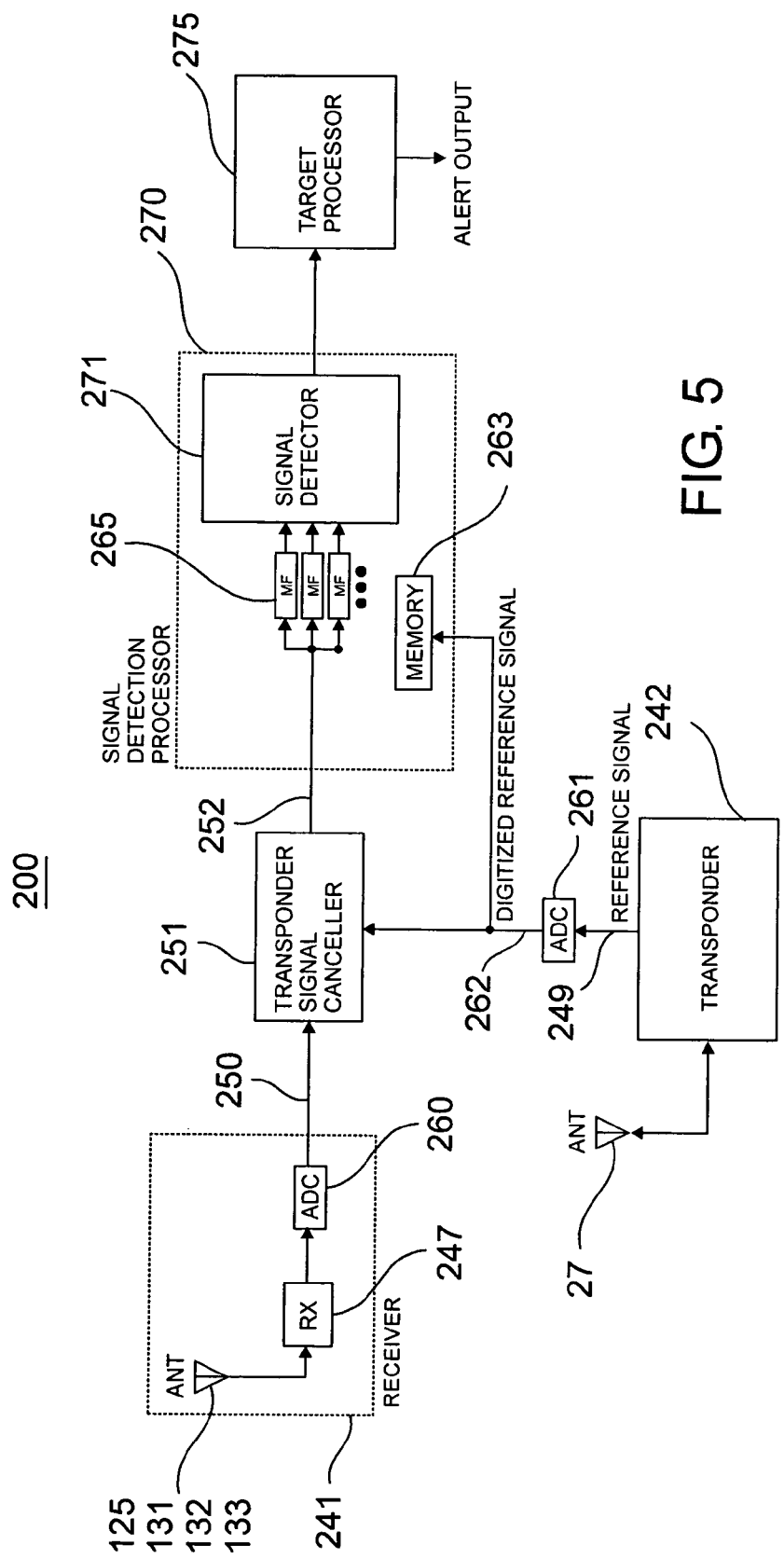
FIG. 5 is an overall block diagram of the avian radar.

A block diagram 200 of the avian radar of the present invention is illustrated in FIG. 5. Receiver section 241 is implemented for each installed antenna at possible locations 125, 131, 132, or 133 and couples each receive antenna to receiver 247. Receiver 247 downconverts and filters reflected target signals and digitizes them using analog to digital converter (ADC) 260. Transponder 242 transmits on antenna 27. Transponder reference signal 249 is a replica of the transponder transmitted signal and can be obtained directly from transponder 242, its antenna cable, or by any other means including a separate low gain antenna.

Transponder reference signal 249 is digitized using ADC 261 and digitized reference signal 262 sent to signal detection processor 270 which match filter detects received avian target signals. Signal detection processor 270 records digitized reference signal 262 in memory 263 and uses it to cross correlate the transmitted and received signals using Doppler bank of matched filters 265. For each target range inspected, only that period of the transmitted and received signals not self jammed at that range are used in the cross correlation.

For example, as was illustrate in FIG. 2, only periods 11 through 16 are cross correlated for targets at range R1 and only periods 3 through 16 are cross correlated for targets at range R2. For each range, the transmission signal 430 ending period cross correlated begins at the round trip range time prior to the end of transmission signal 430 where round trip range time is the radar round trip propagation delay for targets at that range. For target R1, reflections are received after 6 periods so cross correlation occurs over the last 6 periods of transmission signal 430 and reflection 445.

As is common in all modern radars, signal detection processor 270 divides the surveillance range into a series of range increments or range rings. Assume that the 16 periods of transmission signal 430 and reflection 445 represents range increments. Then, immediately after transmission signal 430 ends, signal detection processor 270 detects reflections in the first range increment by cross correlating final period 16 of transmission signal 430 and reflection 445. For the next range increment, periods 15 and 16 are cross correlated. This process continues until periods 3 through 16 are cross correlated for period 14 as illustrated in FIG. 2 for target 425 reflection signal 455.

Signal detector 271 quantizes the amplitude, range, and Doppler shift of detected targets. Target processor 275 applies the threat algorithm to the varying range, amplitude, and Doppler shift values of the detected signals to determine collision threat probability. When a high probability collision threat is detected, an alert is issued to the pilot to commence an evasive maneuver. Slight altitude changes should be sufficient to exit the target collision threat window. The alert may be a warning tone, an aural message, a warning light, a symbol on a display, or any other means that will warn the pilot to look for the collision threat and take evasive action.

Although high transmission signal isolation will be obtained between transponder antenna 136 and the receive antennas, it will not be adequate to avoid all self jamming of faint target signals. To further avoid self jamming of faint target signals, the transmit to receive antenna isolation can be increased by the implementation of transponder signal canceller 251 in avian radar block diagram 200 illustrated in FIG. 5. Digitized reference signal 262 is sent to canceller 251 which cancels any short range transponder signal that appears on receiver section 241 output 250. Short range transponder signals are those that are coupled or directly received from the transponder antenna or are directly received from reflections off aircraft surfaces.

Figure 6:
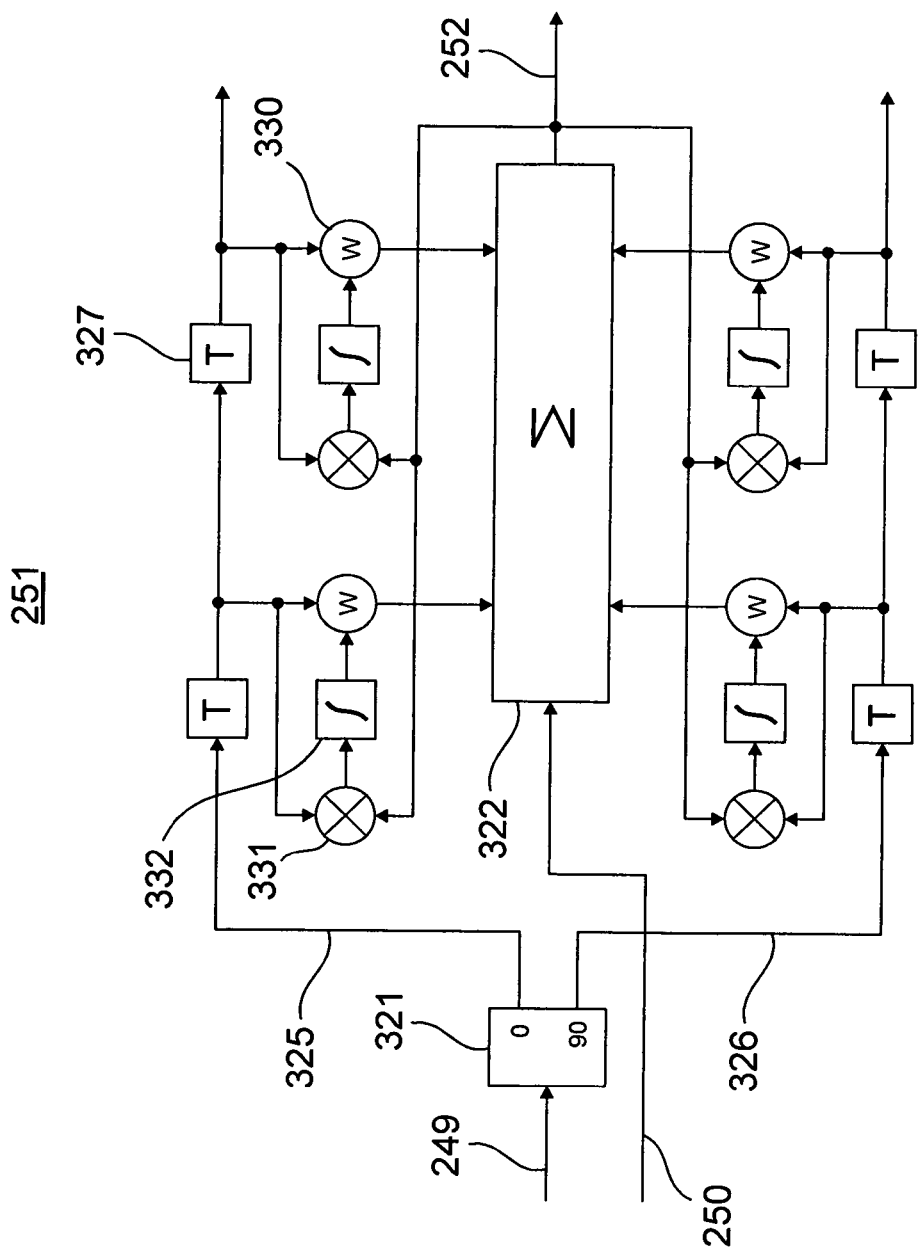
FIG. 6 is a block diagram of a transmit signal canceller.

Canceller 251 is illustrated in FIG. 6 for implementations using analog signals and operates similar to the single tap null steerer described in U.S. Pat. No. 4,079,379. Basically, the amplitude and phase of transponder reference signal 249 is adjusted so that it cancels any similar signal appearing on receiver output 250 using summer 322.

To adjust, reference signal 249 is first split into in-phase signal 325 and quadrature-phase signal 326 using quadrature power splitter 321. These quadrature signals are each passed through a tapped delay line using delay elements 327. Each tap signal is amplitude weighted using weighters 330 and combined in summer 322. Any summer output signal 252 that correlates with weighter 330 input signal is detected using correlator 331, integrated in integrator 332, and drives weighter 330 in a direction which reduces the correlation in correlator 331.

Canceller 251 architecture implements the Least Means Squared (LMS) algorithm of an adaptive null steerer or noise canceller in which weighters 330 are adaptively adjusted to minimize output signal 252 in a least means squared sense. For narrowband signals, no taps are required and only a single set of weighters 330, correlators 331, and integrators 332 are required for each quadrature phase signal. For broadband signals, or multipath signals, multiple taps are required to form broadband nulls or cancellations from multiple paths.

The time constant of integrators 332 can be set quite slow because both transponder antenna 27 and receive antenna 136 are fixed. The amplitude and phase of any transponder signal received by antenna 136 will only vary slowly over time due to temperature changes, etc. Once canceller 251 has adapted, weighter 330 values will essentially be fixed.

Canceller 251 cannot remove target signals because no weighters 330 are placed on receiver output signal 250 and transponder reference signal 249 contains no target signals. Although canceller 251 has been described in terms of discrete components, signals 249 and 250 can be digitized as illustrated in FIG. 5 and canceller 251 can be implemented digitally as is well known by those skilled in the art.

Using a high gain receive antenna, adequate bird detection range may be obtained using Mode A and Mode C transponders on light aircraft which cruise at slower speeds. Higher performance aircraft should all have a Mode S transponder which has a longer message length and thus a longer detection range. As is well know by those skilled in the art, radar detection is a function of transmit energy irrespective of the transmit signal waveform design whereas range resolution and Doppler resolution are determined by the waveform ambiguity function. Therefore, the longer the transponder message length, the greater the transmit energy and detection capability.

Figure 7:
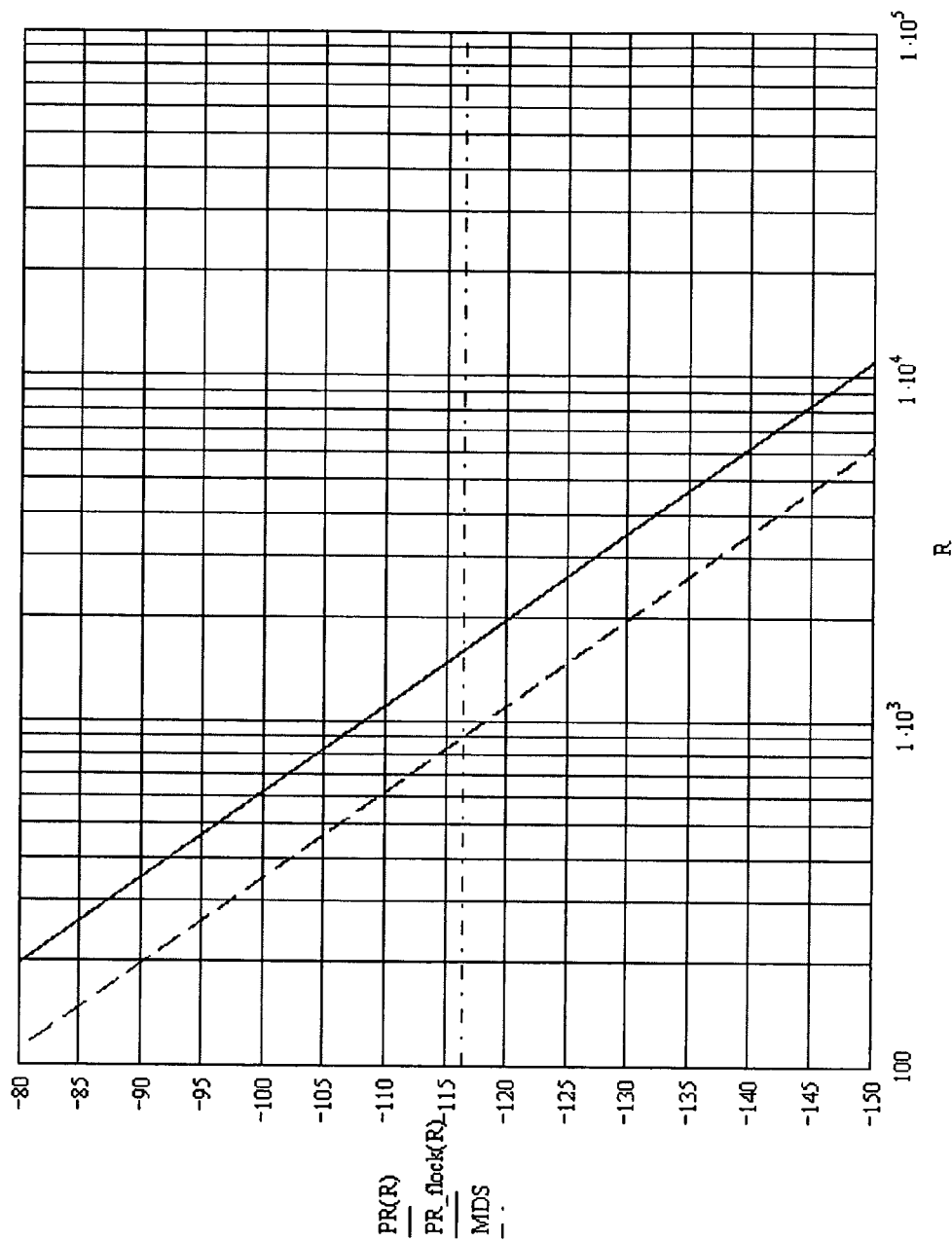
FIG. 7 illustrates the received power level of reflections from avian targets.

The predicted detection range using the entire 112 bit Mode S message is illustrated in FIG. 7 by the dashed line for a single pigeon and by the solid line for a flock of birds where the reflectivity of the flock is 10 dB greater than a single pigeon. The horizontal line represents the minimum discernable signal (MDS) level for a 50% probability of detection (Pd) and a $10^{-4}$ probability of false alarm (Pfa). The vertical axis is the received power in dBm and the horizontal axis is range in meters. A single pigeon can be detected at a range of 900 meters which provides nearly 10 seconds warning of an imminent bird strike collision at 200 knots. Warning time for a flock of birds is approximately 15 seconds. This calculation is based on using an external receiver antenna with a 10 dB gain.

Some collision warning capability against threats from flocks of birds or uncooperative aircraft without TCAS or ADS-B can be obtained using the existing transponder or TCAS antenna. FIG. 8 illustrates transponder and TCAS antenna patterns with respect to the aircraft. Transponder pattern 505 is omnidirectional. Modern TCAS II equipment implement a 4 element antenna which is capable of providing an omnidirectional pattern 505 or forward 510, rear 515, left 520, and right 525 sectored patterns. The TCAS II antenna provides bearing information to other aircraft.

Target positions 530, 535, and 540 with respect to the aircraft illustrate successive detected target positions with successive transponder transmissions 430 that can be used to indicate a potential collision threat. For a TCAS installation, target bearing information is available as is well known by those familiar with TCAS. the range and bearing of the illustrated target at successive positions 530, 535, and 540 can be used to quite accurately determine if an alert should be provided to the pilot. For omnidirectional antenna installations, only the successive target ranges and closure rate are available. For targets at close range and rapidly closing with the aircraft, this would be cause for alarm in most flight situations. By issuing an alert, the pilot could immediately direct his attention to visual "see and avoid".

Range performance is limited on birds due to the low radar sensitivity of this implementation where the existing transponder or TCAS antenna is used as the receive antenna, but the radar can still provide approximately 5 seconds warning for flocks of birds at a speed of 200 knots. Range performance for detecting other aircraft is greater due to the higher reflectivity of aircraft targets. This radar implementation also has the advantage of 360 degree detection capability which provides warnings of approaching aircraft from the sides or behind.

In this simple radar implementation, collision risk can be based on target position versus time. Required radar processing functions can potentially be added to the existing transponder, Mode S, or TCAS equipment. If not, internal data can be placed on an existing or proprietary communications bus (for example an ARINC 429 Bus) to interface with external hardware that would provide these required processing and warning functions.

Although the preferred embodiments of the invention have been illustrated and described in detail, it will be readily apparent to those skilled in the art that various modifications may be made therein without departing from the spirit of the invention.

For example, a Mode S message is composed of a series of individual 500 or 1000 nanosecond pulses. The radar range duration of a 500 and 1000 nanosecond pulse is 75 and 150 meters respectively. If the FAA would allow a series of single pulses to be transmitted for this application, the desired 1 km pigeon target detection range could be obtained assuming the receive antenna has high gain on the order of 20 dB. By accepting a radar dead zone of 75 or 150 meters, canceller 251 would not be required. A 20 dB antenna could be obtained; for example, by implementing an antenna with an elevation beamwidth of approximately 5 degrees and an azimuth beamwidth of 60 degrees.

It may also be possible to mount a long narrow receive antenna array either vertically, horizontally, or in both directions in the radome without interfering with the weather radar. Many other simple modifications are also possible without departing from the spirit of the invention.

What is claimed is:

1. A method for detecting and avoiding an aircraft collision with birds or other airborne hazard, said method comprising:
    using the transmission signal of an existing said aircraft transponder, Mode S, or TCAS installation as the radar transmitter;
    recording a transponder reference signal, said reference signal a replica of said transmission signal;
    receiving reflections of said transmission signal from radar targets in a surveillance range around said aircraft;
    detecting said radar targets by cross correlating said reflections with said reference signal;
    measuring target parameters of said radar targets, said target parameters including range and amplitude of each said radar targets;
    alerting said aircraft pilot when said target parameters indicate a potential collision threat; and
    maneuvering said aircraft to avoid colliding with said airborne hazard when alerted of said collision threat.

2. A method as claimed in claim 1 wherein said reflections are ignored until said transmission signal is completed.

3. A method as claimed in claim 1 wherein said cross correlating is performed over ending period of said reflections and said reference signal, said ending period equal to round trip range propagation delay for targets at said range.

4. A method as claimed in claim 1 further comprising:
    dividing said surveillance range into a plurality of range increments;
    associating a time period with each range increment, said time period equal to radar round trip propagation delay of said range increment distance from said aircraft; and
    detecting a target in said range increment by said cross correlating ending period of said reflections with said ending period of said reference signal, said ending period equal to said time period.

5. A method as claimed in claim 1 further comprising:
    receiving said reflections on said transponder omnidirectional antenna;
    recording successive target positions detected on said successive transmissions; and
    determining said potential collision threat from said successive said target positions and closure rate of said target with said aircraft.

6. A method as claimed in claim 1 further comprising:
    receiving said reflections on TCAS antenna, said TCAS antenna capable of providing target bearing;
    recording successive target position and said target bearing detected on said successive transmissions; and
    determining said potential collision threat from said successive said target position, said target bearing, and closure rate of said target with said aircraft.

7. A method as claimed in claim 1 further comprising:
    providing one or more receive antennas on said aircraft; and
    installing each receive antenna in a location that maximizes isolation between said receive antenna and transponder antenna.

8. A method as claimed in claim 7 wherein said receive antenna is selected from the group consisting of horn antennas and helix antennas.

9. A method as claimed in claim 7 wherein said location is within the leading edge of said aircraft wing or tail.

10. A method as claimed in claim 7 further comprising:
    implementing a transponder signal canceller, said signal canceller configured to remove any said transmission signal appearing on said receive antenna;
    adjusting amplitude of said reference signal, adjusted amplitude equal to amplitude of said transmission signal on said receive antenna;
    adjusting phase of said reference signal, adjusted phase equal and opposite phase of said transmission signal on said receive antenna; and
    summing said adjusted amplitude and said adjusted phase reference signal with said receive antenna signal in said signal canceller to cancel said transmission signal on said receive antenna.

11. A method as claimed in claim 7 wherein amplitude of said reflections are normalized prior to said cross correlating.

12. An apparatus for detecting and avoiding an aircraft collision with birds or other airborne hazard, said apparatus comprising:
    a transponder installed on said aircraft, said transponder configured to transmit a transmission signal in response to air traffic control secondary surveillance radar interrogations;
    one or more receive antennas mounted on said aircraft and configured to receive reflections of said transmission signal from radar targets ahead of said aircraft;
    receivers coupled to each said receive antennas and configured to receive, downconvert, and digitize said reflections;
    a signal detection processor coupled to said receivers and configured to detect and process said reflections;
    a target processor coupled to said signal detection processor and configured to determine if said reflections represent a collision threat between said aircraft and said airborne hazard; and
    means for communicating said collision threat to said aircraft pilot,
    whereby said pilot can maneuver said aircraft to avoid a collision with said airborne hazard.

13. An apparatus as in claim 12 wherein said signal detection processor includes a plurality of filters matched to different Doppler offset frequencies of said reflections of said transmission signal from said radar targets.

14. An apparatus as in claim 12 wherein said signal detection processor includes a signal detector configured to measure target parameters of said radar targets, said target parameters include range and amplitude of each said radar targets.

15. An apparatus as in claim 12 wherein said apparatus additionally comprises:

an analog to digital converter configured to digitize a transponder reference signal, said reference signal a replica of said transmission signal;

a memory configured to temporarily store digitized samples of said reference signal; and a cross correlator configured to cross correlate said reflections with said digitized samples of said reference signal.

16. An apparatus as in claim 12 wherein said apparatus additionally comprises:

transponder signal cancellers coupled to each of said receive antennas, each said signal cancellers configured to remove any said transmission signal appearing on said receive antennas.

17. An apparatus as in claim 12 wherein said receive antennas consist of a receive antenna mounted in each said aircraft wing, said receive antennas configured to determine said collision threat of said radar targets by triangulation.

* * * * *